United States Patent
Felwor

(10) Patent No.: US 10,668,528 B2
(45) Date of Patent: Jun. 2, 2020

(54) METHOD FOR PRODUCING A ROTOR BLADE

(71) Applicant: Siemens Aktiengesellschaft, Munich (DE)

(72) Inventor: David Felwor, Oberhausen (DE)

(73) Assignee: Siemens Aktiengesellschaft, Munich (DE)

( * ) Notice: Subject to any disclaimer, the term of this patent is extended or adjusted under 35 U.S.C. 154(b) by 299 days.

(21) Appl. No.: 15/531,452

(22) PCT Filed: Nov. 2, 2015

(86) PCT No.: PCT/EP2015/075384
§ 371 (c)(1),
(2) Date: May 29, 2017

(87) PCT Pub. No.: WO2016/087140
PCT Pub. Date: Jun. 9, 2016

(65) Prior Publication Data
US 2017/0259329 A1    Sep. 14, 2017

(30) Foreign Application Priority Data

Dec. 4, 2014 (EP) .................................... 14196293

(51) Int. Cl.
*F01D 5/28* (2006.01)
*B22D 19/02* (2006.01)
(Continued)

(52) U.S. Cl.
CPC ............ *B22D 19/02* (2013.01); *B22F 3/1055* (2013.01); *B22F 5/04* (2013.01); *B22F 7/08* (2013.01);
(Continued)

(58) Field of Classification Search
CPC ............. F05D 2230/00; F05D 2230/31; F05D 2230/21; F05D 2230/22; F05D 2220/32;
(Continued)

(56) References Cited

U.S. PATENT DOCUMENTS 2,825,530 A    3/1958 Schum et al.
10,267,164 B2 *  4/2019 Berdou .................. B29B 11/16
(Continued)

FOREIGN PATENT DOCUMENTS

EP    2644829 A1    10/2013
EP    2801512 A1    11/2014
(Continued)

OTHER PUBLICATIONS

International Search Report dated Feb. 12, 2016, for PCT/EP2015/075384.

*Primary Examiner* — Hai H Huynh
*Assistant Examiner* — Gonzalo Laguarda
(74) *Attorney, Agent, or Firm* — Beusse Wotler Sanks & Maire

(57) ABSTRACT

A method for producing a rotor blade for a gas turbine, the blade having a fastening region and a platform, on which a blade ending in a blade tip is arranged. The method is designed to facilitate a particular high efficiency of the gas turbine with a particularly resource-saving manner of production. The method includes: production of a reinforcement; casting of a first part of the rotor blade about at least one portion of the reinforcement; and construction of a second part of the rotor blade by a 3D-printing method.

15 Claims, 3 Drawing Sheets

(51) Int. Cl.
*B22F 3/105* (2006.01)
*B22F 5/04* (2006.01)
*B22F 7/08* (2006.01)
*F01D 5/14* (2006.01)
*B29L 31/08* (2006.01)

(52) U.S. Cl.
CPC .......... *F01D 5/147* (2013.01); *B29L 2031/08* (2013.01); *F01D 5/282* (2013.01); *F05D 2220/32* (2013.01); *F05D 2230/21* (2013.01); *F05D 2230/22* (2013.01); *F05D 2230/31* (2013.01); *Y02P 10/295* (2015.11); *Y02T 50/672* (2013.01)

(58) Field of Classification Search
CPC .. F01D 5/147; F01D 5/282; B22F 5/04; B22F 3/1055; B22F 7/08; B22D 19/02; B29L 2031/08
USPC .......... 416/223 R; 29/888.02, 888.025, 889, 29/889.2, 889.21, 889.7, 889.71
See application file for complete search history.

(56) References Cited

U.S. PATENT DOCUMENTS

| | | |
|---|---|---|
| 2011/0142684 A1 | 6/2011 | Campbell et al. |
| 2012/0201691 A1 | 8/2012 | Dautl et al. |
| 2014/0234088 A1 | 8/2014 | Brandl |
| 2015/0017007 A1 | 1/2015 | Brandl |
| 2015/0064015 A1* | 3/2015 | Perez ...................... F01D 5/282 416/229 R |
| 2015/0064016 A1* | 3/2015 | Cortequisse .............. B22F 5/04 416/230 |
| 2016/0186574 A1* | 6/2016 | Weber ..................... F01D 5/187 416/95 |
| 2017/0175534 A1* | 6/2017 | Ferber ..................... F01D 5/147 |
| 2018/0161872 A1* | 6/2018 | Brunhuber ................ F01D 5/14 |

FOREIGN PATENT DOCUMENTS

| | | |
|---|---|---|
| GB | 2399049 A | 9/2004 |
| JP | S6332104 A | 2/1988 |
| JP | 2014047788 A | 3/2014 |
| WO | 2015058043 A1 | 4/2015 |

* cited by examiner

METHOD FOR PRODUCING A ROTOR BLADE

CROSS REFERENCE TO RELATED APPLICATIONS

This application is the US National Stage of International Application No. PCT/EP2015/075384 filed Nov. 2, 2015, and claims the benefit thereof. The International Application claims the benefit of European Application No. EP14196293 filed Dec. 4, 2014. All of the applications are incorporated by reference herein in their entirety.

FIELD OF INVENTION

The invention relates to a method for producing a rotor blade for a gas turbine, the blade having a fastening region and a platform, on which a blade airfoil ending in a blade tip is arranged. It furthermore relates to a rotor blade of this kind.

BACKGROUND OF INVENTION

Rotor blades of the abovementioned type are used in gas turbines to convert the energy of a hot gas flow into rotational energy. They typically have a blade airfoil, which is penetrated by cavities for carrying cooling air and which is fastened on a "platform". Adjoining the platform there is a fastening region for fastening the turbine blade on the rotor or stator of the gas turbine.

Currently, rotor blades for gas turbines are produced by casting from a single piece and a single material. This is generally performed by way of the vacuum precision casting method. As part of further improvement in the efficiency of current gas turbines, particularly by increasing the mass flow, it has been found, however, that stability problems can occur with turbine blades produced by this method. Moreover, the mold used to produce the cooling ducts is generally not reusable.

SUMMARY OF INVENTION

It is therefore an object of the invention to specify a method and a rotor blade of the type stated at the outset which permit a particularly high efficiency of the gas turbine in combination with production which is particularly economical in terms of resources.

As regards the method, this object is achieved, according to the invention, in that the method comprises the following method steps:—production of a reinforcement;—casting of a first part of the rotor blade around at least one part of the reinforcement; and—buildup of a second part of the rotor blade by means of a 3-D printing method.

As regards the rotor blade, the object is achieved in that the rotor blade comprises a reinforcement arranged in the interior.

Here, the invention starts from the consideration that the design of the turbine rotor blade stage, particularly of the fourth turbine rotor blade stage, comes up against limits in terms of production engineering when it comes to increasing the mass flow through the gas turbine: the rotor blade is supposed to have an internal structure described at the outset and to be actively cooled. In this case, determination and evaluation of critical parameters and characteristics derived from the flow area and rotational speed, particularly in the case of the fourth turbine rotor blade stage, have shown that it would be necessary to embody the component wall thickness in the upper region of the blade airfoil at about 1 mm within very narrow limits. In the case of such a large component, it is generally difficult to implement a wall thickness of 1 mm. This problem can be solved by not producing the rotor blades completely in the casting process but producing them by means of a 3-D printing method. In this process, very complex geometries can be produced in the interior of the blades. The problem is that lower component strength is achieved with the known 3-D printing methods. In order to increase the strength of the rotor blades produced by 3-D printing, the proposal is therefore to use a composite material. As with steel reinforced concrete, the intention is to insert stays of a stronger material into the base material. This reinforcement, together with said stays, is produced first of all, after which parts of the rotor blade are cast around the reinforcement and, finally, the finer parts of the rotor blades, in particular, e.g. the cooling air ducts, are built up by means of 3-D printing.

Just as with steel reinforced concrete, the stays are intended to be aligned in the direction of the principal load. This applies especially to the load imposed by the centrifugal force during the operation of the gas turbine, which acts radially outward, i.e. in the direction of the blade tip, and increases continuously toward the blade tip. The reinforcement should therefore advantageously comprise at least one stay, which extends from a region of the rotor blade tip to the platform, and therefore through the entire blade airfoil in the direction of the load. Stabilization of the blade airfoil with respect to the occurring centrifugal force is thereby achieved.

Stability is improved even further if the reinforcement advantageously comprises a stay which extends from the region of the rotor blade tip to the fastening region. The entire rotor blade structure, from the fastening region at the rotor blade root to the tip of the blade airfoil, is thereby stabilized by a continuous stay.

As a further advantageous embodiment of the method, the above-described first part, which is cast around the reinforcement, comprises the fastening region. The fastening region, which generally has a tongue and groove structure resembling a firtree, generally comprises only a few cooling ducts, if any, and therefore has a less complex geometry. It is therefore also possible, in particular, to produce it using a reusable mold. Casting the fastening region furthermore ensures that said region has the required strength, and good cohesion with the reinforcement is produced.

The same applies to the platform, which seals off the fastening region from the hot gas in the turbine duct. This platform too can be cast using a reusable mold and, as a result, has a particularly high strength. The cast first part therefore advantageously comprises the platform.

As a further advantageous embodiment of the method, the cast first part of the rotor blade comprises a sheath for at least some of the stays of the reinforcement in one region of the blade airfoil. In other words: a sheath of solid material is cast around the reinforcement in the region of the blade airfoil. This sheath can be cast around the respective stay in a predetermined thickness, for example. A composite structure with the reinforcement, which acts as a substrate for 3-D printing, is thereby produced.

It is advantageous if the reinforcement is manufactured from steel. In this context, currently used blade materials are suitable, in particular, e.g. high-strength steels or alloys with an appropriately high tensile strength and a high modulus of elasticity in comparison with the surrounding material. The high strength of such materials makes them particularly suitable for absorbing the centrifugal forces which occur during operation and for stabilizing the rotor blade. Moreover, they have a high melting point, and therefore they remain stable during the process of casting the blade root or the sheath.

The second rotor blade part, which is built up by means of the 3-D printing method, advantageously comprises one region of the blade airfoil. It is precisely here that complex structures, e.g. cooling ducts, have to be produced, and these can be shaped in a particularly simple and flexible manner by means of 3-D printing.

It is advantageous if these cooling ducts are arranged in the region of the blade airfoil during the buildup of the second part.

In an advantageous embodiment of the method, selective laser fusion is used as the 3-D printing method. In selective laser fusion, the material to be processed is applied in powder form, in a thin layer, to the already cast part of the rotor blade. The powdered material is completely remelted locally by means of laser radiation and, after solidification, forms a solid layer of material. The rotor blade is then lowered by the amount of one layer thickness and powder is applied again. This cycle is repeated until all the layers have been remelted.

It is advantageous if a rotor blade for a gas turbine is produced by one of the methods described up to this point.

It is advantageous if a gas turbine comprises a rotor blade of this kind.

The advantages achieved by means of the invention consist especially in that the weakness of 3-D printing materials is compensated by the use of a composite material and that such a method can be used for producing turbine blades. With the method, the wall thickness of the blade airfoil can be less, and it is also possible to produce longer rotor blades, thus improving the efficiency and power of the gas turbine.

BRIEF DESCRIPTION OF THE DRAWINGS

Illustrative embodiments of the invention are explained in greater detail by means of a drawing, in which.

DETAILED DESCRIPTION OF INVENTION

In all the figures, identical parts are provided with the same reference signs.

Figure 1:
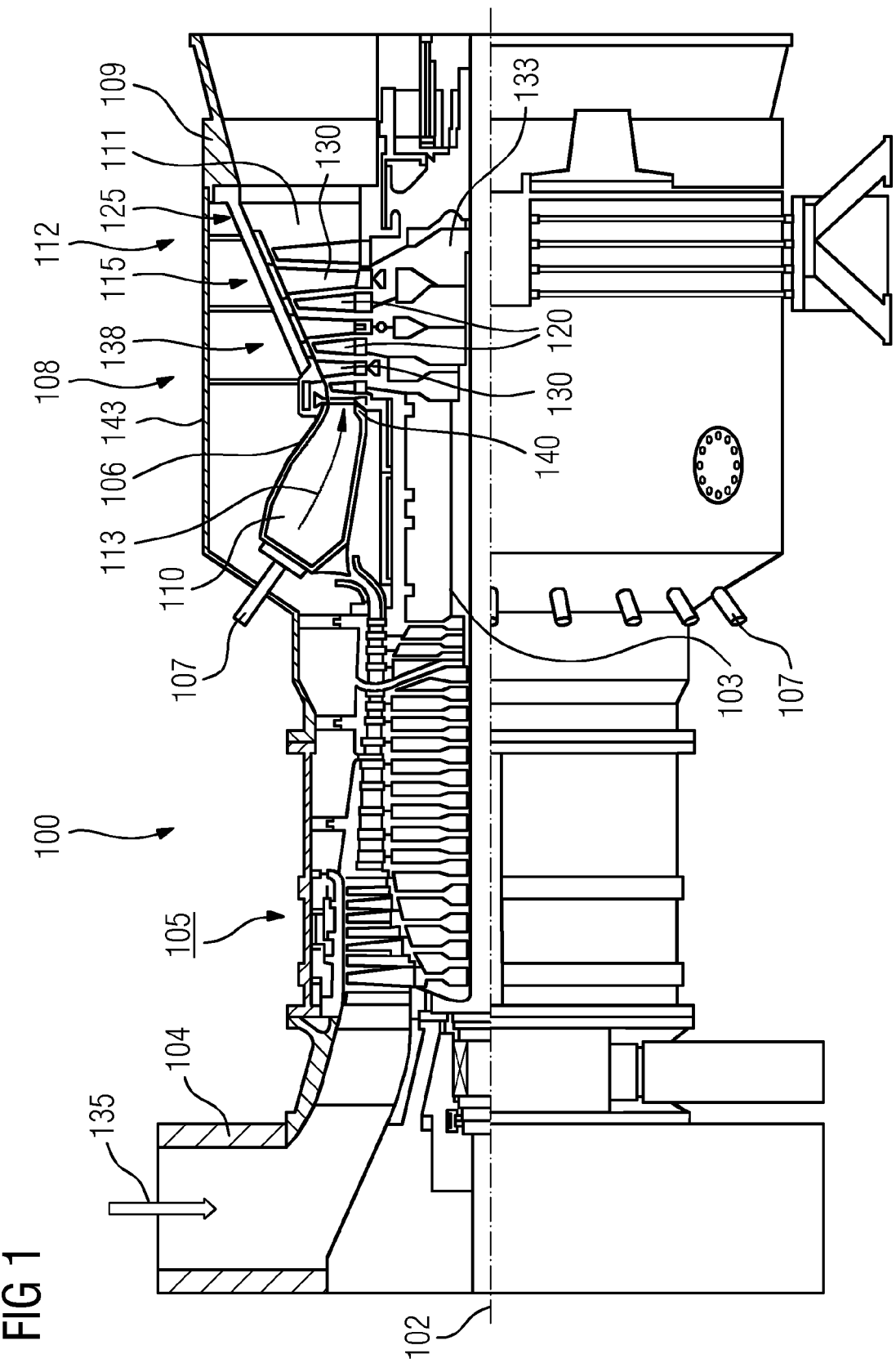
FIG. 1 show a partial longitudinal section through a gas turbine.

FIG. 1 shows a gas turbine 100 in a partial longitudinal section. A turbine is a continuous flow machine which converts the internal energy (enthalpy) of a flowing fluid (liquid or gas) into rotational energy and ultimately into mechanical driving energy.

In the interior, the gas turbine 100 has a rotor 103, which is mounted so as to rotate about an axis of rotation 102 (axial direction) and which is also referred to as a turbine rotor. Situated one after the other along the rotor 103 are an intake casing 104, a compressor 105, a toroidal combustion chamber 110, in particular an annular combustion chamber 106, having a plurality of coaxially arranged burners 107, a turbine 108 and the exhaust casing 109.

The annular combustion chamber 106 communicates with an annular hot gas duct 111. There, four turbine stages 112 arranged in series, for example, form the turbine 108. Each turbine stage 112 is formed by two blade rings. When viewed in the flow direction of a working medium 113, a guide blade row 115 is followed in the hot gas duct 111 by a row 125 formed by rotor blades 120. The blades 120, 130 have a slightly curved profile, similar to an aircraft wing.

In this case, the guide blades 130 are fastened on the stator 143, whereas the rotor blades 120 of a row 125 are mounted on the rotor 103 by means of a turbine disk 133. The rotor blades 120 thus form component parts of the rotor or turbine wheel 103. A generator or a machine (not shown) is coupled to the rotor 103.

During the operation of the gas turbine 100, air 135 is drawn in and compressed by the compressor 105 through the intake casing 104. The compressed air supplied at the turbine end of the compressor 105 is passed to the burners 107 and is mixed there with a fuel. The mixture is then burnt in the combustion chamber 110 to form the working medium 113. From the combustion chamber, the working medium 113 flows along the hot gas duct 111, past the guide blades 130 and the rotor blades 120.

Some of the internal energy of the fluid flow is removed by the—as far as possible—eddy-free laminar flow of the turbine blades 120, 130, and this energy is transferred to the rotor blades 120 of the turbine 108. This then imparts rotation to the rotor 103, as a result of which, first of all, the compressor 105 is driven. The useful power is output to the machine (not shown).

During the operation of the gas turbine 100, the components exposed to the hot working medium 113 are subject to thermal loads. Apart from the heat shield blocks lining the annular combustion chamber 106, the guide blades 130 and rotor blades 120 of the first turbine stage 112, as viewed in the flow direction of the working medium 113, are subject to the highest thermal loads. The high loads render materials capable of bearing extreme loads necessary. The turbine blades 120, 130 are therefore manufactured from titanium alloys, nickel super alloy or tungsten-molybdenum alloys. The blades are protected by coatings against corrosion (MCrAlX; M=Fe, Co, Ni, rare earths) and heat (heat insulation layer, e.g. $ZrO_2$, $Y_2O_4$-$ZrO_2$) to ensure greater resistance to temperature and erosion, such as pitting. The heat shield coating is referred to as a thermal barrier coating or TBC for short. Further measures for making the blades more resistant to heat consist in sophisticated cooling duct systems. This technique is used both in the guide blades and in the rotor blades 120, 130.

Each guide blade 130 has a guide blade root (not shown here) facing the inner casing 138 of the turbine 108 and a guide blade head situated opposite the guide blade root. The guide blade head faces the rotor 103 and is fixed on a sealing ring 140 of the stator 143. In this arrangement, each sealing ring 140 surrounds the shaft of the rotor 103. Each rotor blade 120 likewise has a rotor blade root of this kind, as illustrated in the following figures, but ends in a rotor blade tip.

Figure 2:
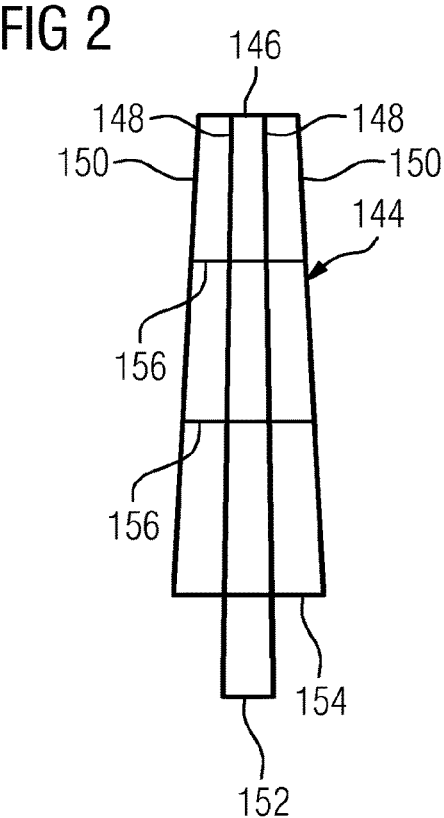
FIG. 2 shows a reinforcement for a rotor blade.

FIG. 2 shows a reinforcement 144 for a rotor blade 120 of this kind. The reinforcement 144 has an upper transverse stay 146.

A total of four longitudinal stays 148, 150 point downward from the upper transverse stay 146 at equal spacings from one another, extending away from one another slightly in a radiating pattern. The two central longitudinal stays 148 are somewhat longer than the outer longitudinal stays 150. They are of equal length and are connected at the end thereof by a lower transverse stay 152. At the end of the outer longitudinal stays 150, which are likewise of equal length, said stays are connected to one another and to the central longitudinal stays 150 by a further transverse stay 154. Between the further transverse stay 154 and the upper transverse stay 146, all the longitudinal stays 148, 150 are connected to one another by central transverse stays 156 arranged at regular spacings.

The arrangement of the longitudinal and transverse stays 146, 148, 150, 152, 154, 156 which is shown in FIG. 2 is only illustrative. In further alternative embodiments, it is, of course, possible to choose the number, orientation and distribution of the stays to match the forces which occur.

The longitudinal and transverse stays 146, 148, 150, 152, 154, 156 thus form a stable reinforcement 144, which can be arranged in the interior of a rotor blade 120. The process for producing the rotor blade 120 is explained with reference to the following figures. First of all, the reinforcement 144 is produced as described. It consists of a high-strength steel alloy and remains stable in the casting process shown in FIGS. 3 and 4.

Figure 3:
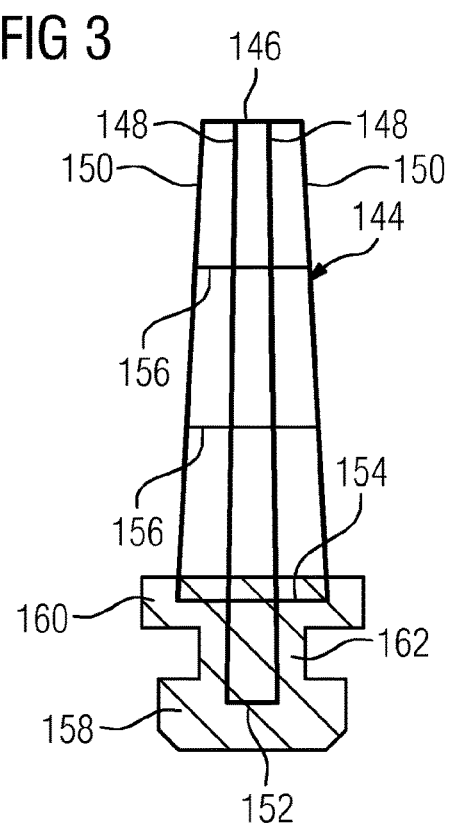
FIG. 3 shows the reinforcement with a cast blade root in section.

In a first illustrative embodiment of the method, only the rotor blade root 158 is cast, as shown in FIG. 3. This root comprises a platform 160 for sealing off the inner regions of the rotor 103 from the hot gas in the hot gas duct 111 and comprises a fastening region 162, which has a tongue on both sides, which is formed for a tongue and groove joint on the rotor. As can be seen, the transverse stay 154 is situated in the platform 160 here. Those regions of the central longitudinal stays 148 which extend downward beyond the transverse stay 154, and the lower transverse stay 152, are situated in the fastening region 162.

Figure 4:
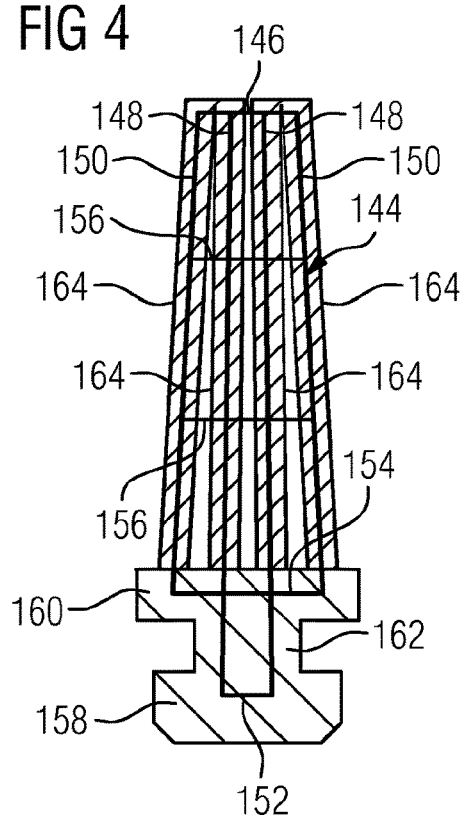
FIG. 4 shows the reinforcement with a cast blade root and partial sheathing of the reinforcement.

In a second illustrative embodiment of the method, sheaths 164 for each longitudinal stay 150, 152 are cast in addition to the rotor blade root 158, as shown in FIG. 4. These sheaths can be of cylindrical design, for example, with the longitudinal stay 150, 152 as an axis. In both illustrative embodiments, a comparatively simple, reusable mold can be used in casting.

Figure 5:
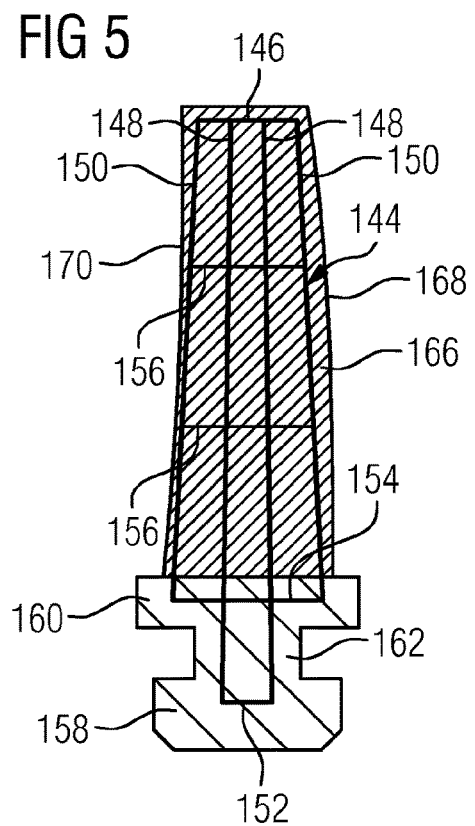
FIG. 5 shows a section through the rotor blade.

Finally, FIG. 5 shows the finished rotor blade 120. The remaining parts of the body of the rotor blade 120 have been produced by means of selective laser fusion, starting from the component shown in FIGS. 3 and 4. The part produced in this way comprises the blade airfoil 166, in particular, wherein the upper transverse stay 146 of the reinforcement 144 is arranged in the region of the rotor blade tip 167.

The blade airfoil 166 has a relatively complex geometry: its profile resembles that of an aircraft wing. It has a rounded profile nose 168 and a profile rear edge 170. Extending between the profile nose 168 and the profile rear edge 170 are a concave pressure-side wall and a convex suction-side wall of the rotor blade 120. A plurality of cooling air ducts (not shown specifically) are introduced in the interior, between the pressure-side wall and the suction-side wall.

The complex geometry described can be built up in a particularly simple manner by means of 3-D printing, starting from the partially cast rotor blade 120. The structural weaknesses of the material produced by 3-D printing are compensated by the reinforcement 144.

The invention claimed is:

1. A method for producing a rotor blade for a gas turbine, the rotor blade comprising a fastening region and a platform on which a blade airfoil ending in a blade tip is arranged, the method comprising:
 disposing a reinforcement comprising plural interconnected stays in a mold;
 casting a first part of the rotor blade in the mold and around at least part of the reinforcement, wherein the first part comprises the fastening region, wherein part of the reinforcement is subsumed in the fastening region, and wherein a remainder of the reinforcement protrudes from the fastening region; and
 building up of a second part of the rotor blade on the first part by a 3-D printing method,
 wherein the plural interconnected stays comprise a stay which extends from a region of the blade tip to the fastening region.

2. The method as claimed in claim 1,
 wherein the first part further comprises the platform.

3. The method as claimed in claim 1,
 wherein the first part comprises plural sheaths, wherein each sheath of the plural sheaths is cast around and dedicated to a respective stay of the plural interconnected stays, and wherein the second part is built-up on the plural sheaths.

4. The method as claimed in claim 1,
 wherein the reinforcement comprises steel.

5. The method as claimed in claim 1,
 wherein the second part comprises a region of the blade airfoil.

6. The method as claimed in claim 5,
 wherein cooling ducts are formed in the region of the blade airfoil during the building up of the second part.

7. The method as claimed in claim 1,
 wherein selective laser fusion is used as the 3-D printing method.

8. A rotor blade for a gas turbine,
 produced by the method as claimed in claim 1.

9. A gas turbine comprising:
 a rotor blade as claimed in claim 8.

10. The method as claimed in claim 1, wherein the reinforcement comprises a material that is stronger than a material of the second part of the rotor blade.

11. The method as claimed in claim 1, wherein the remainder of the reinforcement is at least partly subsumed by the second part.

12. A rotor blade for a gas turbine, comprising:
 a fastening region, a platform, an airfoil mounted on the platform, and a blade tip;
 a reinforcement comprising plural interconnected metal stays at least partly subsumed within a cast portion of the rotor blade, wherein the cast portion comprises the fastening region, and wherein some of the plural interconnected metal stays originate in the fastening region and terminate at the blade tip.

13. A method, comprising:
 disposing a discrete reinforcement structure comprising a plural interconnected structural stays in a mold;
 casting a root of a rotor blade around the discrete reinforcement structure to form an assembly comprising: a casting comprising a fastening region; and the discrete reinforcement structure which is only partly subsumed by the casting; and
 3-D printing a second part of the rotor blade onto the casting and around a portion of the discrete reinforcement structure that protrudes from the root;
 wherein the plural interconnected structural stays comprise a stay which extends from a region of a blade tip to the fastening region.

14. The method of claim 13, wherein the plural interconnected structural stays comprise material that is stronger than a material of the second part.

15. The method of claim 14, wherein the casting comprises casting plural sheaths, wherein each sheath of the plural sheaths is cast around and dedicated to a respective stay of the plural interconnected structural stays, and wherein the second part is built-up on the plural sheaths.

\* \* \* \* \*